US005270821A

United States Patent [19]

Samuels

[11] Patent Number: 5,270,821

[45] Date of Patent: Dec. 14, 1993

[54] VIDEO DISPLAY ADJUSTMENT AND ON-SCREEN MENU SYSTEM

[75] Inventor: James V. Samuels, Monmouth Junction, N.J.

[73] Assignee: Acer Incorporated, Taipei, Taiwan

[21] Appl. No.: 796,411

[22] Filed: Nov. 22, 1991

[51] Int. Cl.[5] .................................................. H04N 5/44

[52] U.S. Cl. .................................... 358/188; 358/903; 455/200.1; 455/198.1; 455/233.1; 345/156; 340/825.76

[58] Field of Search ...................... 358/188, 194.1, 903; 455/197.1, 198.1, 200.1, 230, 188.1, 190.1, 233.1, 188.2; 340/701, 703, 825.22, 825.72, 825.73, 825.76, 713, 714, 706, 731

[56] References Cited

U.S. PATENT DOCUMENTS 4,024,531 5/1977 Ashby ................................ 340/714
4,405,836 9/1983 Meyerhoff .......................... 455/345
4,495,652 1/1985 Leslie .............................. 455/186.1
4,710,800 12/1987 Fearing et al. ........................ 358/28
4,755,955 7/1988 Kimura et al. ...................... 340/751
4,837,627 6/1989 Mengel ............................ 358/194.1
5,005,084 4/1991 Skinner ........................... 358/194.1
5,051,827 9/1991 Fairhurst ............................ 358/143

*Primary Examiner*—Victor R. Kostak
*Assistant Examiner*—Jeffrey S. Murrell
*Attorney, Agent, or Firm*—Kenneth M. Kaslow

[57] ABSTRACT

An EEPROM stores multiple sets of video display parameters for a multi-frequency video display. A microcontroller receives input from a user, changes the stored display parameters and outputs changes in the parameters to the video display. The microcontroller also controls video display apparatus that displays on-screen menus and value indicator graphs for facilitating user input. The video display apparatus incorporates a video clock synchronized to the horizontal synchronization signal of the multi-frequency display, to keep the displayed menus synchronized regardless of the current frequency. In addition, the video display apparatus elongates displayed characters at higher frequencies to control the absolute size of displayed characters across frequencies. The present invention provides for changes to video display parameters, and for resetting the display parameters to factory standards, without manipulating electromechanical devices such as potentiometers.

16 Claims, 18 Drawing Sheets

25
DB0 DB1 DB2 DB DB4 DB5 DB6 DB7
D0 D1 D2 D3 D4 D5 D6 D7
A0 A1 A2 A3 A4 A5 A6 A7 A8 A9 A10
CS OE WE
COL0 COL1 COL2 COL3 COL4 ROW0 ROW1 ROW2 ROW3 ROW4 ROW5
WEEP*
RD*
PE*
ROW[0...5]
WRAM*
CS*
ROW4 ROW3 ROW2 ROW1 ROW0 COL4 COL3 COL2 COL1 COL0
KE CS
A9 A8 A7 A6 A5 A4 A3 A2 A1 A0
D3 D2 D1 D0
40
DB7 DB6 DB5 DB4
01 02 03 04 05 06 07 08
42
U1
A0 A1 A2 A3 A4 A5 A6 A7 A8
CE
LNE0 LNE1 LNE2 DB0 DB1 DB2 DB3 DB4 DB5
40
DB3 DB2 DB1 DB0
D3 D2 D1 D0
KE CS
A9 A8 A7 A6 A5 A4 A3 A2 A1 A0
WRAM*
SC*
ROW4 ROW3 ROW2 ROW1 ROW0 COL4 COL3 COL2 COL1 COL0
TO FIG. 2C
TO FIG. 2D

VIDEO DISPLAY ADJUSTMENT AND ON-SCREEN MENU SYSTEM

BACKGROUND OF THE INVENTION

The present invention relates to video display systems, and more particularly, to using on-screen menus in adjusting multi-frequency cathode ray tube (CRT) displays.

Video displays incorporating CRT systems provide information to and receive information from computer systems. The versatility of CRT systems, and the variety of ways they display data, have ensured their widespread use. Early video displays typically were single-frequency displays: the video adaptor card that operated the display (by sending information from the computer to the display) used a single horizontal scanning frequency tuned to that of the display. A card fabricated for a particular single-frequency display often will not work with other displays. Multi-frequency video displays represent an important improvement in video display technology, for a single display system can be attached to a wide variety of video adaptor cards. The multi-frequency display can tune itself to the horizontal frequency of the attached adaptor card, and synchronize the display to the information sent from the adaptor card.

While multi-frequency displays provide a great improvement over single-frequency displays, and allow versatile connections of displays and adaptor cards, these displays exacerbate problems common to video displays in general. Most video displays provide some form of adjustments for users. Typically, a panel of knobs and buttons connected to potentiometers or other electrical switches allow the user to adjust various display characteristics. Contrast, brightness, and the horizontal and vertical image positions are some of the possible adjustments one can make. Since these adjustments are made manually using electromechanical devices, the adjustments are susceptible to slight shifts over time. Movement of the display, changes in ambient temperature and environmental vibrations can all alter carefully set adjustments.

Multi-frequency displays that incorporate electromechanical user adjustments share these problems of misadjustment. In addition, these displays multiply adjustment problems for each new frequency mode available. Each time a user changes the frequency mode used by the monitor, all the adjustments made previously must be readjusted to compensate for changes in the display. Furthermore, once these changes ;ire adjusted, they again become susceptible to slow misadjustment.

Multi-frequency displays present further manufacturing difficulties. In addition to user-operated external controls, each video display possesses a number of internal controls that precisely adjust the display. These internal controls are preset at the factory by a human operator comparing the display against a standard. To ensure comparable operation across frequency modes, multi-frequency displays often hive separate sets of these adjustments for each of several principle frequency bands. Each of these adjustment sets must then be hand-adjusted by a factory operator. Again, the electro-mechanical nature of the controls allows for gradual drift in their adjustment.

Current methods for adjusting, video displays, particularly in multi-frequency systems, do not provide a complete and flexible system for allowing users and manufacturers to quickly and reliably set display controls. What is needed is an improved method and apparatus for adjusting, video displays. An improved video display adjustment apparatus and method should allow the factory to quickly set all internal controls for a monitor, without operator intervention. The improved apparatus and method should also allow end-users to easily change display characteristics, or reset the characteristics back to those specified at the factory. The method and apparatus should also maintain the video display characteristics despite thermal, mechanical or other environmental changes. The improved method and apparatus should provide techniques and apparatus applicable to a wide range of video display devices, including CRTS, LCDs and electro-luminescent displays. The invention should provide a simple and cost-effective technology for easily and accurately changing and maintaining the characteristics of any video display.

SUMMARY OF THE INVENTION

In accordance with the present invention, a video display adjustment and on-screen menu system combines a microcontroller and erasable EPROM memory with on-screen menu display generation to allow users to change display parameters without making any electromechanical adjustments. The microcontroller effects display changes through display adjustment circuitry, enabling digital control over display parameters. In addition, the present invention incorporates a novel video clock to ensure accurate synchronization of the on-screen menu to any horizontal signal received by the video display.

The user enters commands to the microcontroller by pressing a set of buttons, or other similar input devices on the video display, in response to selections displayed by the on-screen menu. User commands are latched and accessed by the microcontroller; and changes to display parameters made by the user are written to an EEPROM memory that in the preferred embodiment can store a set of adjustments for each of up to 32 possible operational frequency modes.

The display adjustment circuitry includes a digital-to-analog converter (DAC) that converts display parameters provided by the microcontroller in digital form to an analog signal that is multiplexed via a set of analog switches to a plurality of sample-and-hold circuits. Upon start-up, these circuits are loaded with and maintain current display parameters, until changed by the user.

The on-screen menu generation circuitry includes a set of column and row counters that keep track of the next menu location to be displayed. Because higher horizontal frequencies indicate higher resolutions, the characters of the menu are adjusted to maintain a relatively constant character size. The microcontroller determines how many vertical lines are being displayed, and then a character size control block determines whether to double the number of times a pixel line of a given character is repeated, essentially elongating the character. When a line repeats, the row counter does not increment despite the fact that another horizontal synch signal was received. The current column and row values address a display memory, loaded by the microcontroller, that contains the menu information. As each menu character is read out of the display memory at the appropriate column and row, its visual representation is provided by a character PROM and then sent to a shift register where each pixel is clocked out to a video drive.

The video clock governs the operation of the column and row counters, and that of the shift register, and thereby the flow of menu information to the display. The novel video clock of the present invention stops operation for a given scan line when the end of the column counters are reached for each menu line. The video clock resumes its operation when the next horizontal synch signal occurs. In this way, the menu remains intact and readable regardless of what horizontal frequency the display currently uses.

The present invention allows users to easily and precisely adjust the parameters of a multi-frequency video display without adjusting electromechanical inputs. Once parameters are chosen and stored for a given frequency, they can be retrieved and employed by the microcontroller on starting up the video display. Furthermore, a number of different parameter sets can be stored, such that chancing video display frequencies automatically restores the appropriate parameter set without further user input. Since all parameters are stored digitally, display parameters can be easily reset to factory standards if desired. Moreover, each parameter set will not degrade with time or environmental changes.

The present invention also provides an easy method for adjusting display parameters in the factory, during assembly and testing. By providing a PC connection port (in addition to the front panel user input), each display can be connected to an automated testing station. A testing station might include a video camera, display cards for displaying test patterns on screen, and a computer controller. The testing station can cycle through a series of tests for different display frequencies, adjusting all internal controls electronically through the PC connection port. Each group of adjustments would then be stored as a factory-standard parameter set.

The methods and apparatus of the present invention provide novel techniques for adjusting and storing sets of parameters for multi-frequency displays. The methods of storing parameters in EEPROM memory, and retrieving parameters using a microcontroller, allows display parameters to be adjusted for each horizontal synch frequency. Using simple user input buttons, and a programmable on-screen menu, the present invention avoids making adjustments using fallible, imprecise electromechanical devices. The apparatus and methods of the present invention provide for synchronizing the menu display regardless of the horizontal synchronization frequency. In addition, the present invention provides for adjustable menu character sizes across frequencies. The methods and apparatus of the present invention provide easily implemented, compact, inexpensive devices for adjusting the display characteristics of multi-frequency video displays, both during assembly in the factory and during operation by the user. These and other features and advantages of the present invention are apparent from the description below with reference to the following drawings.

DESCRIPTION OF THE PREFERRED EMBODIMENTS

Figure 1:
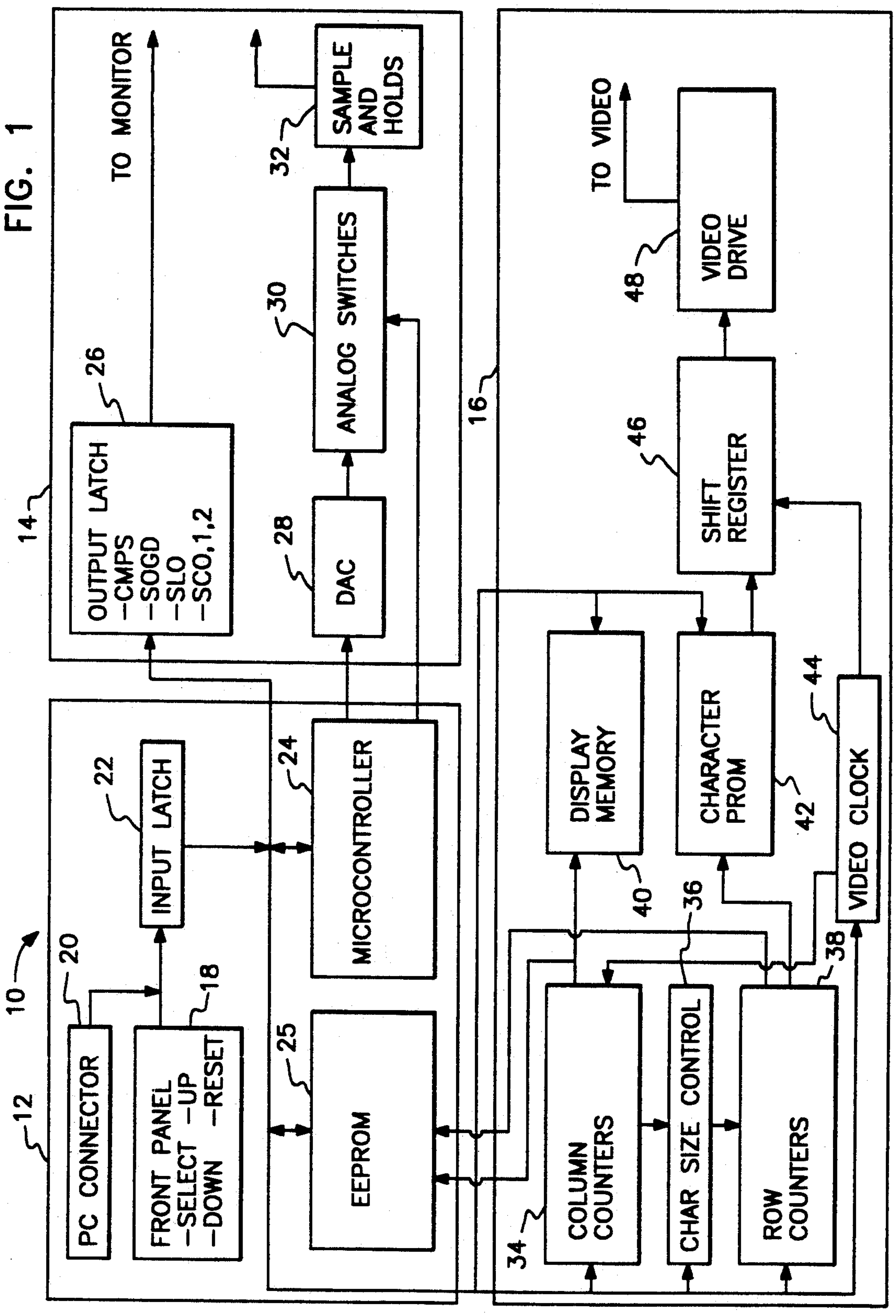
FIG. 1 shows a block diagram of a video display adjustment and on-screen menu system in accordance with the present invention.
Figure 2A:
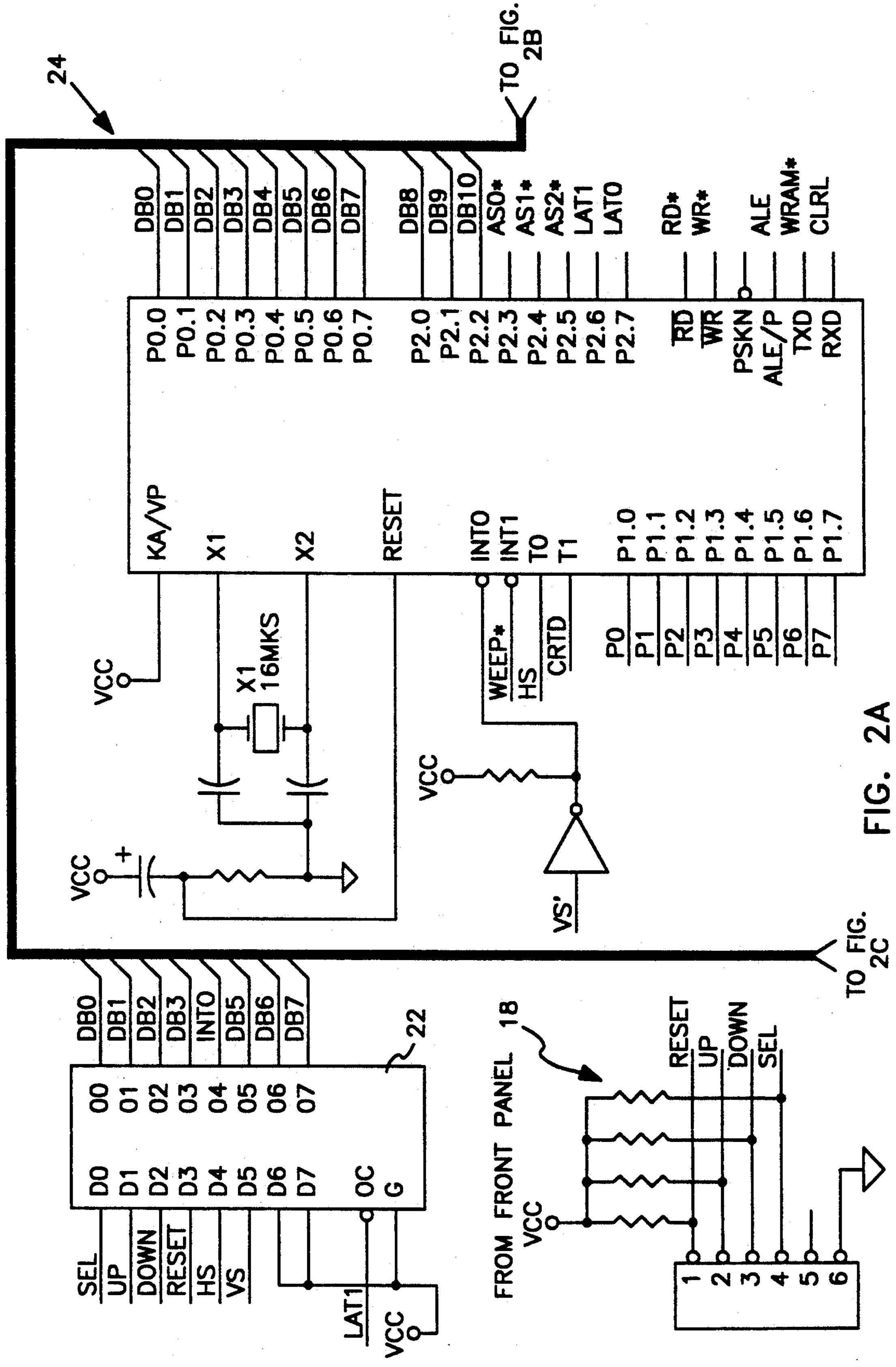
FIGS. 2A-2H (with FIG. 21 showing the interconnection) show a circuit diagram of a video display adjustment and on-screen menu system in accordance with the present invention.
Figure 2B:
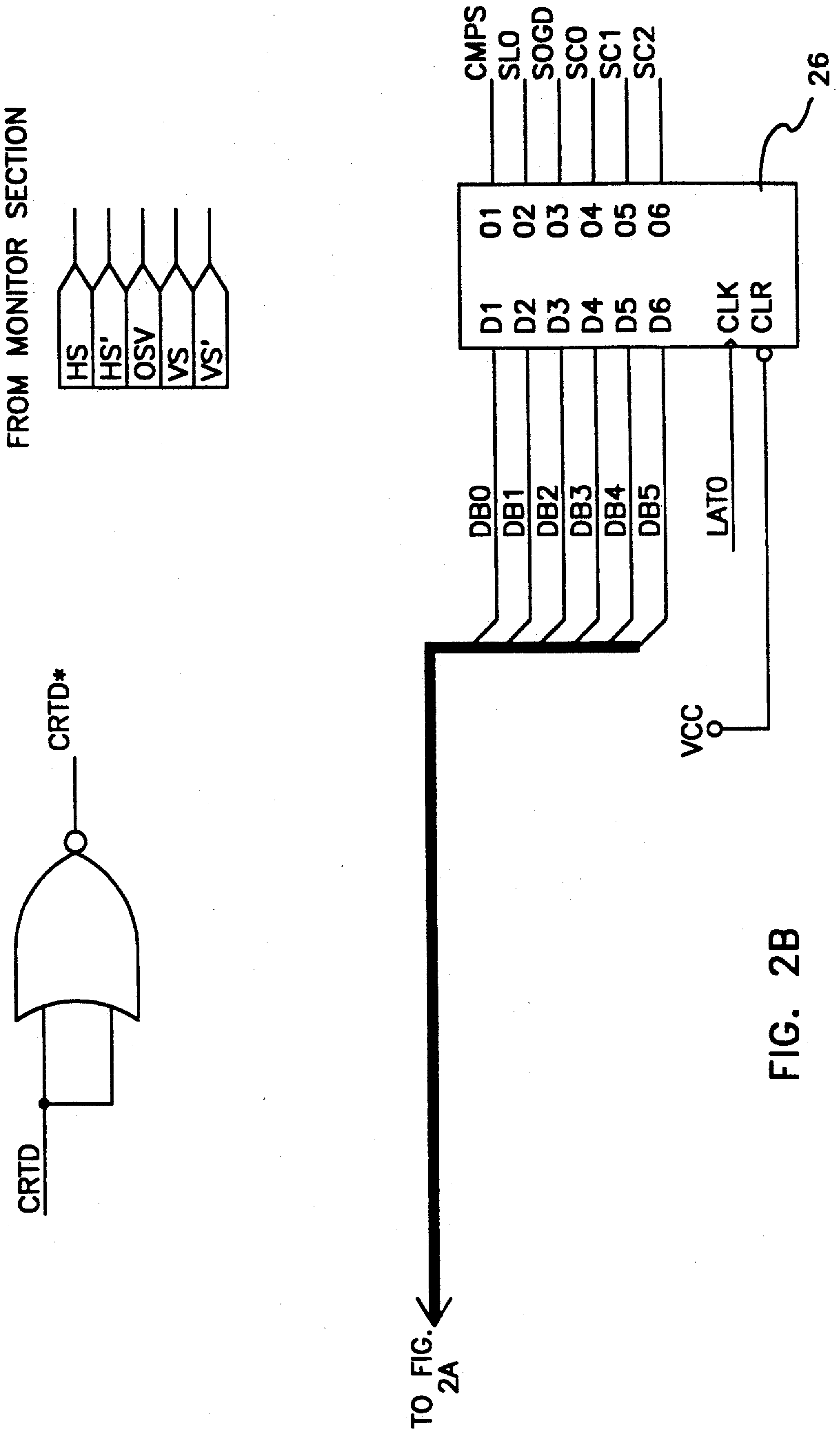
Figure 2C:
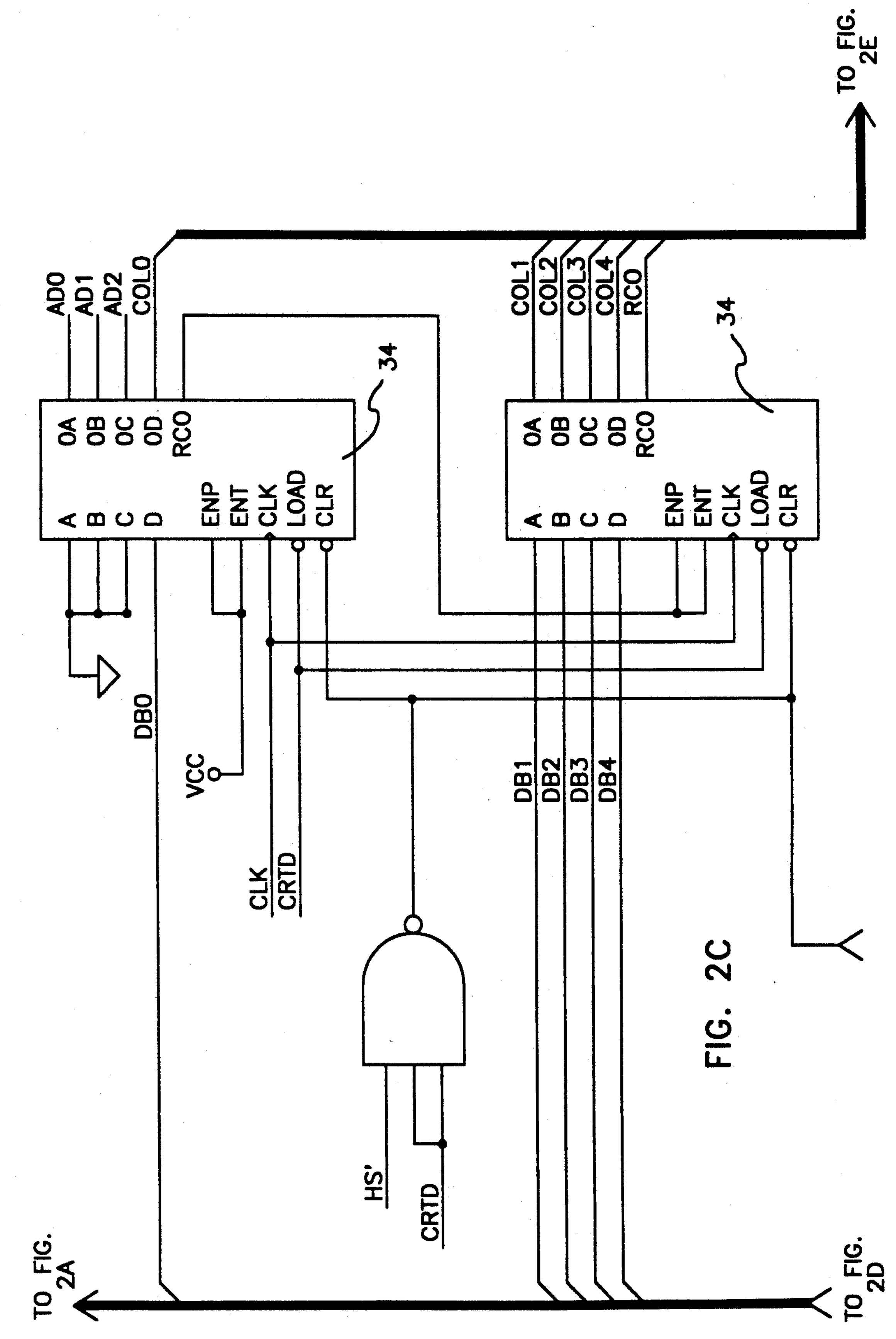
Figure 2D:
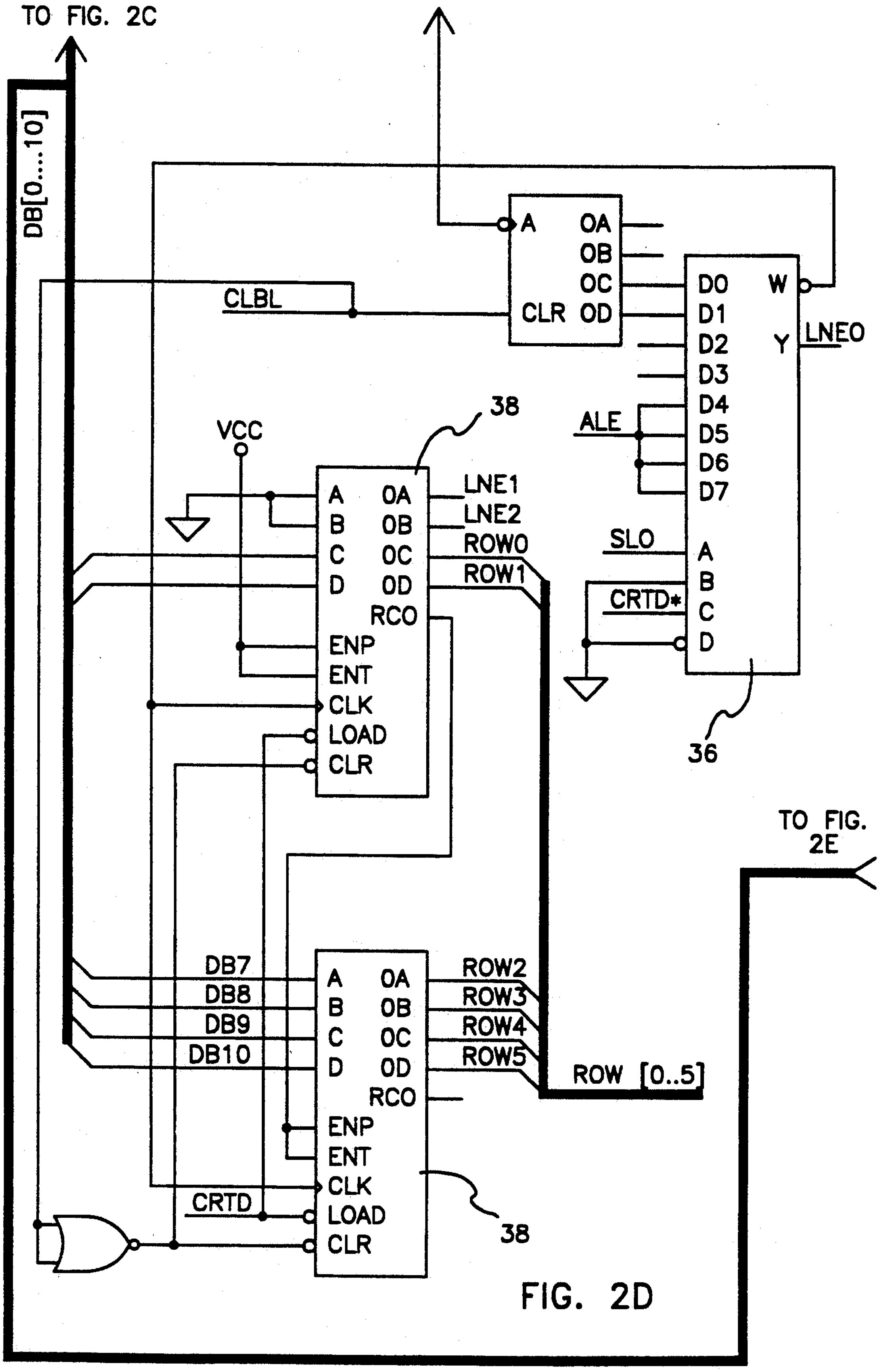
Figure 2E:
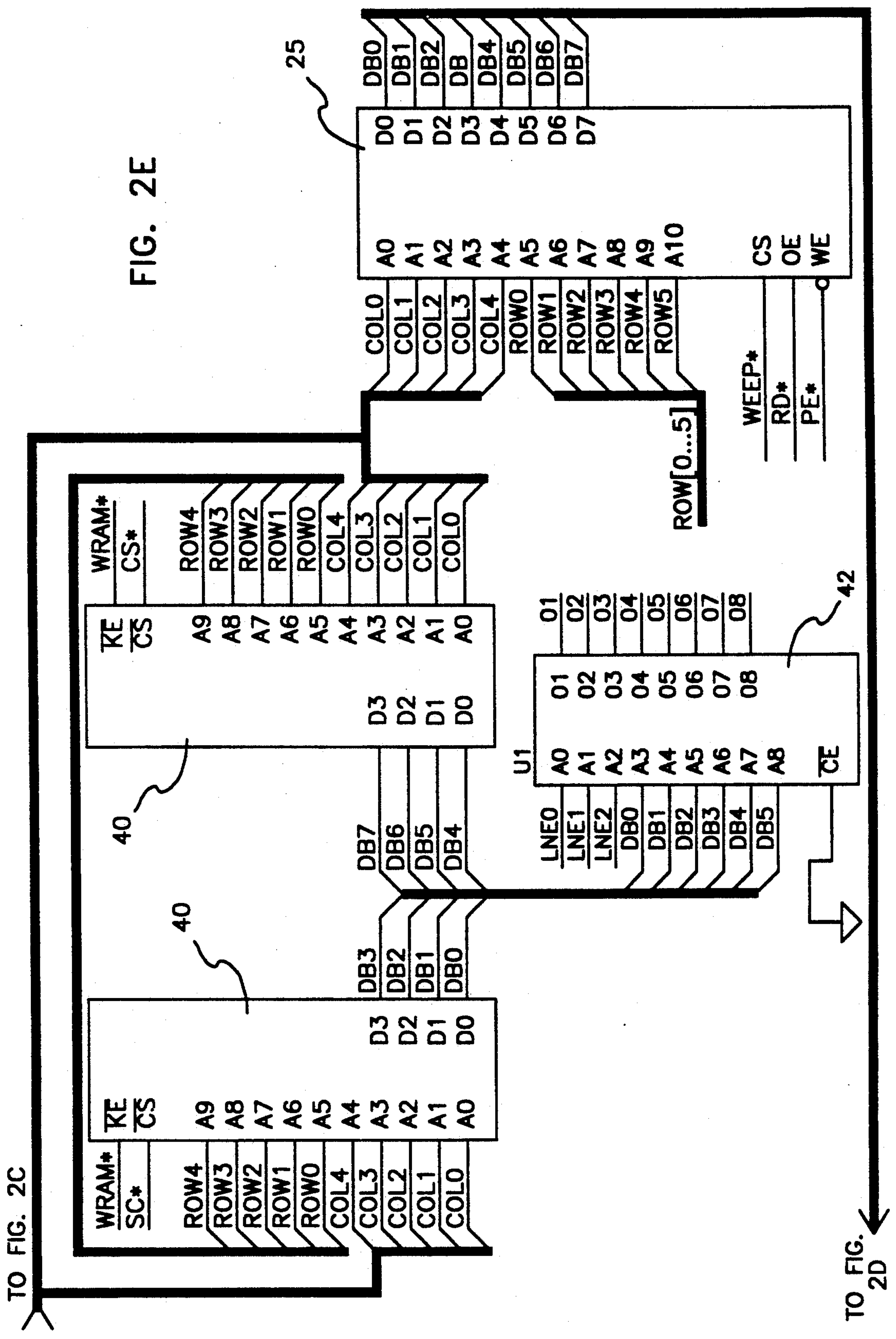
Figure 2F:
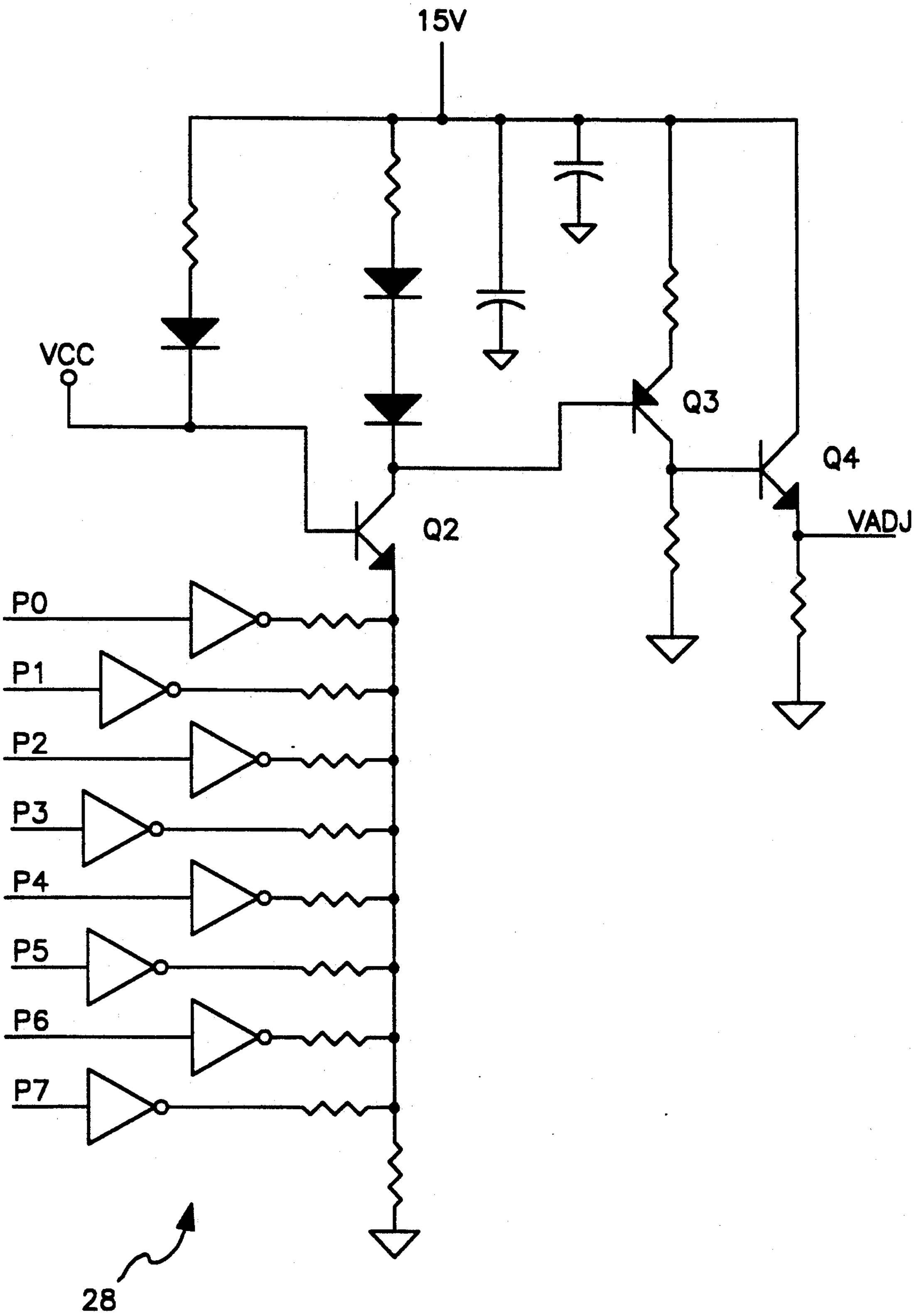
Figure 2G:
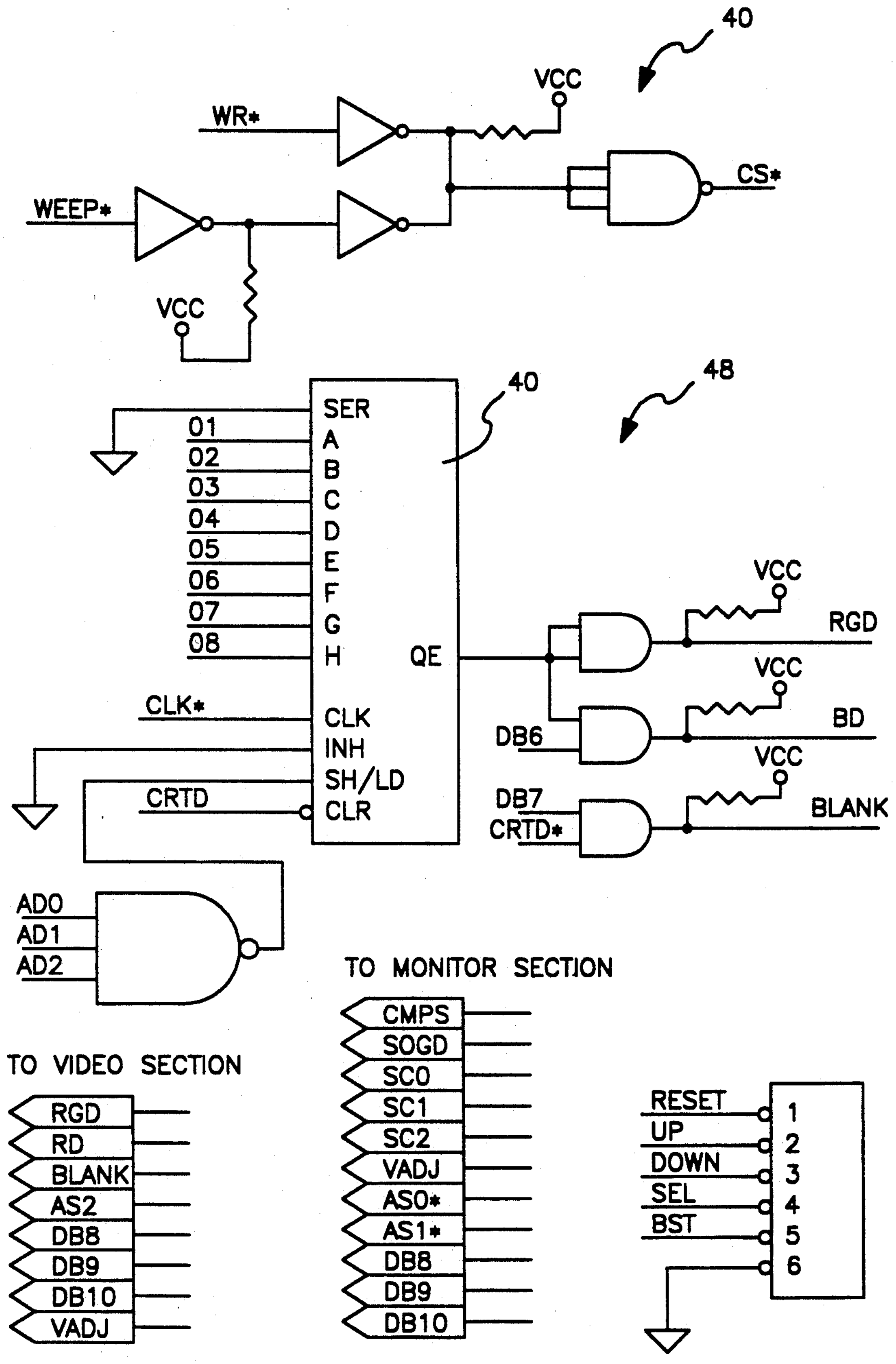
Figure 2H:
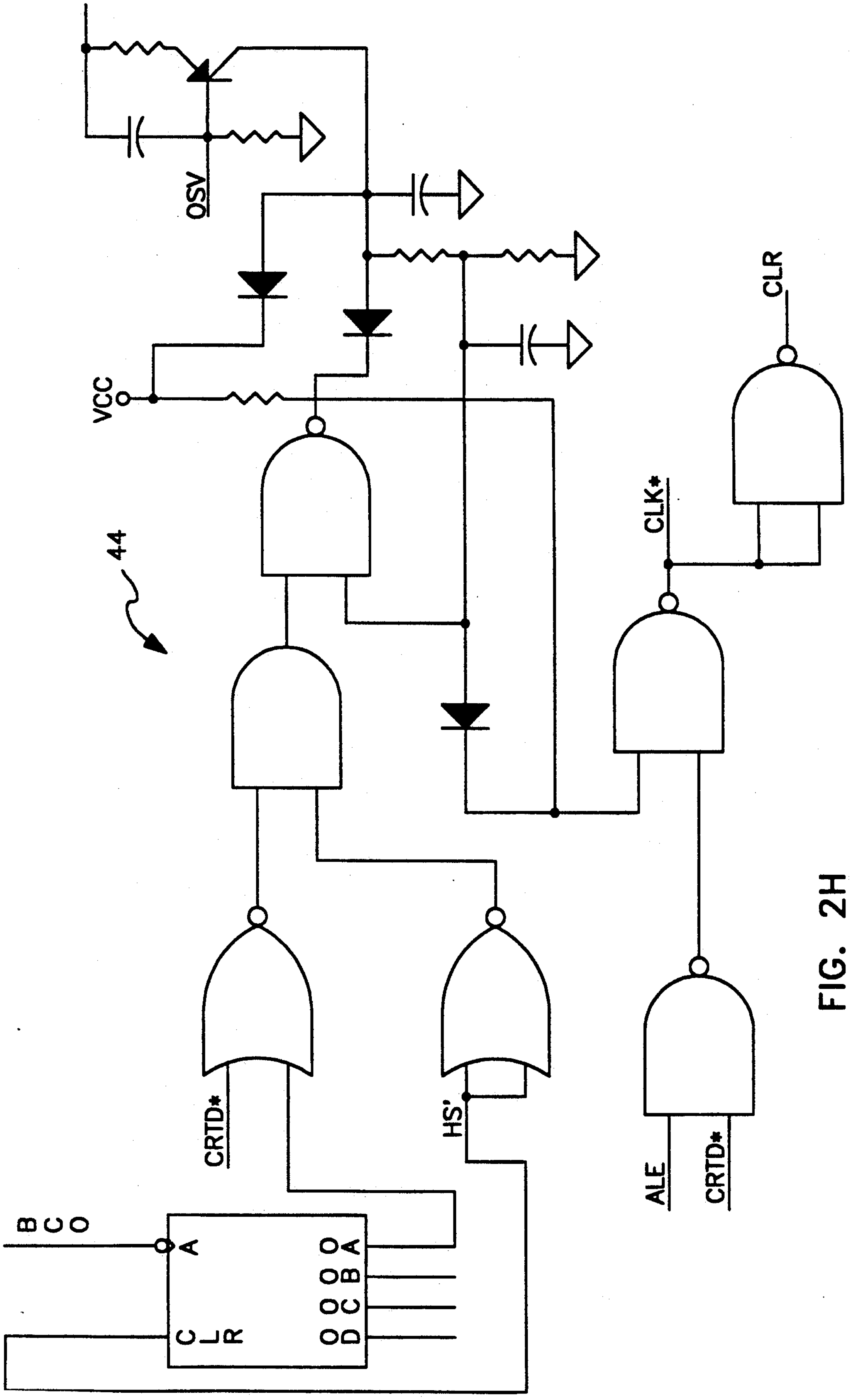
Figure 2I:
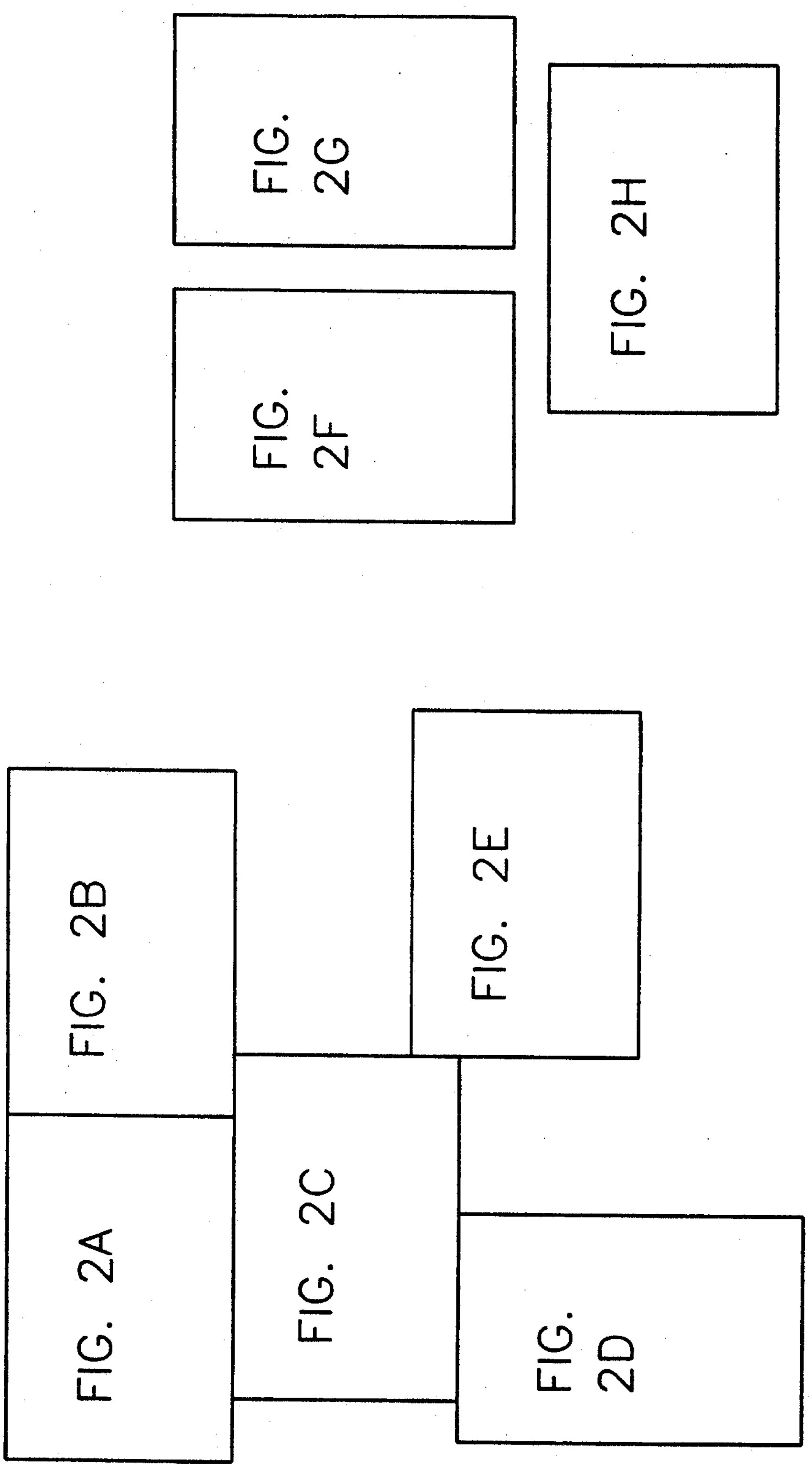

In accordance with the present invention, FIG. 1 shows a schematic diagram of the video display adjustment and on-screen menu system 10 in accordance with the present invention. The system 10 comprises three principle functional blocks: an input, memory storage and controller block 12, a video display adjustment block 14 and a character display block 16. Within the input, memory storage and controller block 12, either a front panel 18 or a PC connector 20 can be used to input adjustment selections to the system 10. These inputs are temporarily buffered in an input latch 22. A microcontroller 24 accepts these inputs from the input latch 22, and stores changes to the video display parameters in an EEPROM memory storage area 25.

Within the video display adjustment block 14, certain display parameters provided by the microcontroller are buffered by an output latch 26. The majority of the display parameters are sequentially sent to a DAC 28 that converts the parameters to analog signals. These analog signals are demultiplexed by a series of analog switches 30 enabled after every vertical sync pulse. The signals of each switch 30 are stored by a complementary series of sample-and-hold circuits 32. These circuits hold the parameters for display operation until new parameters are provided.

The third block, the character display block 16, generates and sends on-screen menu information to the video display synchronized to the display's horizontal frequency. The column counters 34 increment for each pixel being sent divided by the number of pixels per character. In the preferred embodiment, each character is 8 pixels across, so the column counters 34 divide the video clock signal by eight. When the column counters 34 reach their end, the current line of the menu has been reached. A character size control block 36 then decides whether to repeat the current pixel Ene (essentially elongating a character). Because higher horizontal frequencies indicate an increased vertical resolution of the display screen, repeating individual character lines increases their vertical size. Characters in the preferred embodiment are created on an 8 by 8 grid, and then each pixel line is doubled, to create an 8 by 16 displayed character. At higher frequencies, each pixel line of a character is doubled once more to create an 8 by 32 displayed character. Once a set of repetitions of a character's pixel line are completed, the character size control block allows the row counters 38 to increment to the next pixel line of the characters in the menu.

A display memory 40 holds the current array of character codes that make up the displayed menu. Every eight video clock ticks, the column counter 34 increments to indicate the next character code in the current menu line. Every 16 (or if doubled, 32) horizontal sync pulses (scan lines), the row counters 38 increment the display memory 40 to the next full line of character codes in the current menu. The current character code (in ASCII) pointed to in the display memory 40 by the column and row counters 34 and 38 refers to character display information stored in a character PROM memory 42. Every horizontal sync pulse, the row counters 34 indicate which pixel line of the current character display information is read out of the character PROM 42. These pixel lines are repeated 2 or 4 times depending on the horizontal frequency, as described. The pixel line for each character in the current embodiment is 8 pixels wide and is stored in a shift register 46, where it is clocked out to a video drive 48. The video drive 48 blanks the current space on the video screen and replaces the video display with the current pixel line of character display information. A video clock 44 provides the appropriate video clock information to the column counters 34, the row counters 38 and the shift register 46 for synchronizing the output of each pixel of menu information.

Figure 3A:
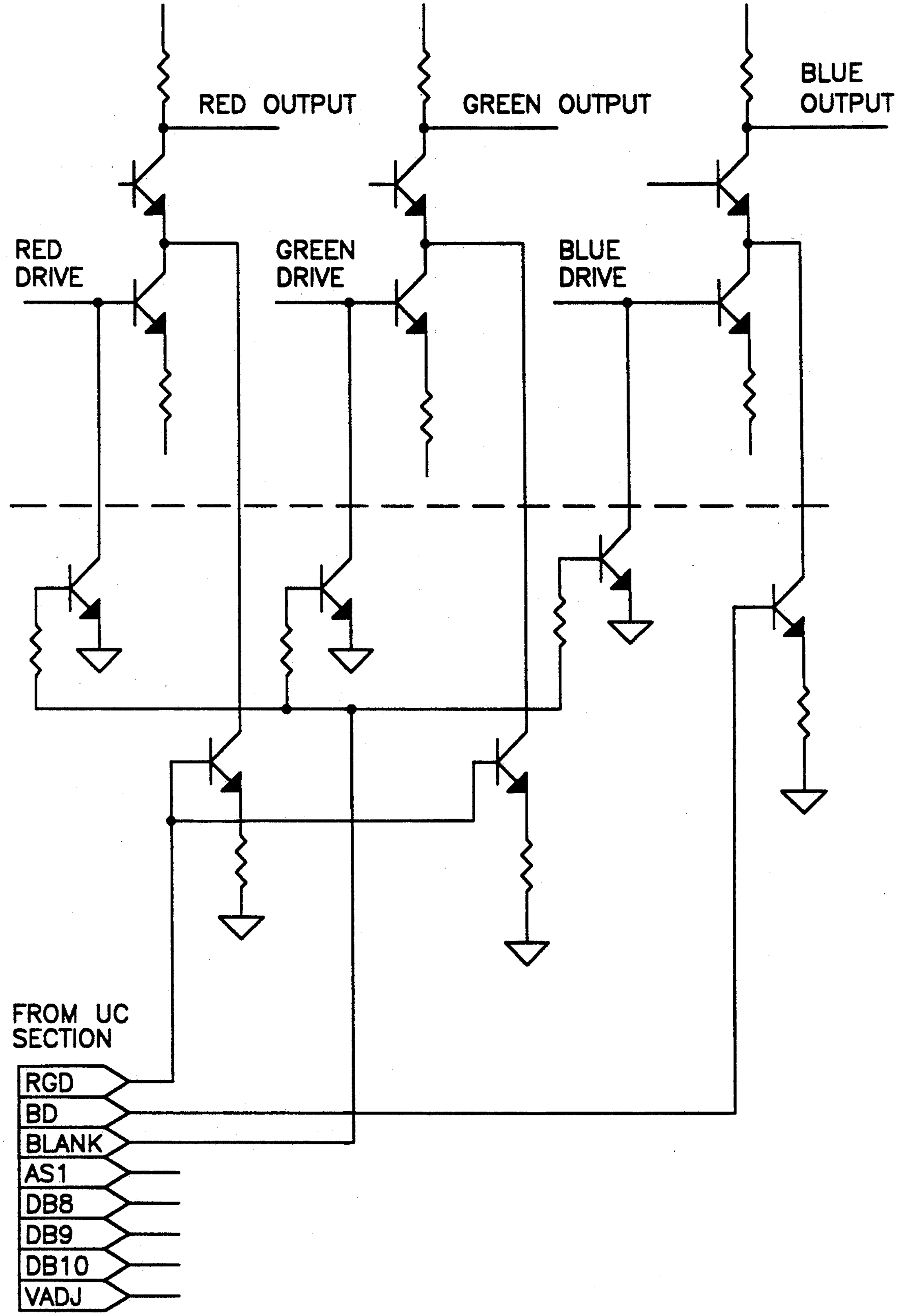
FIGS. 3A-3B a circuit diagram of an analog switch and associated sample and hold circuits.
Figure 3B:
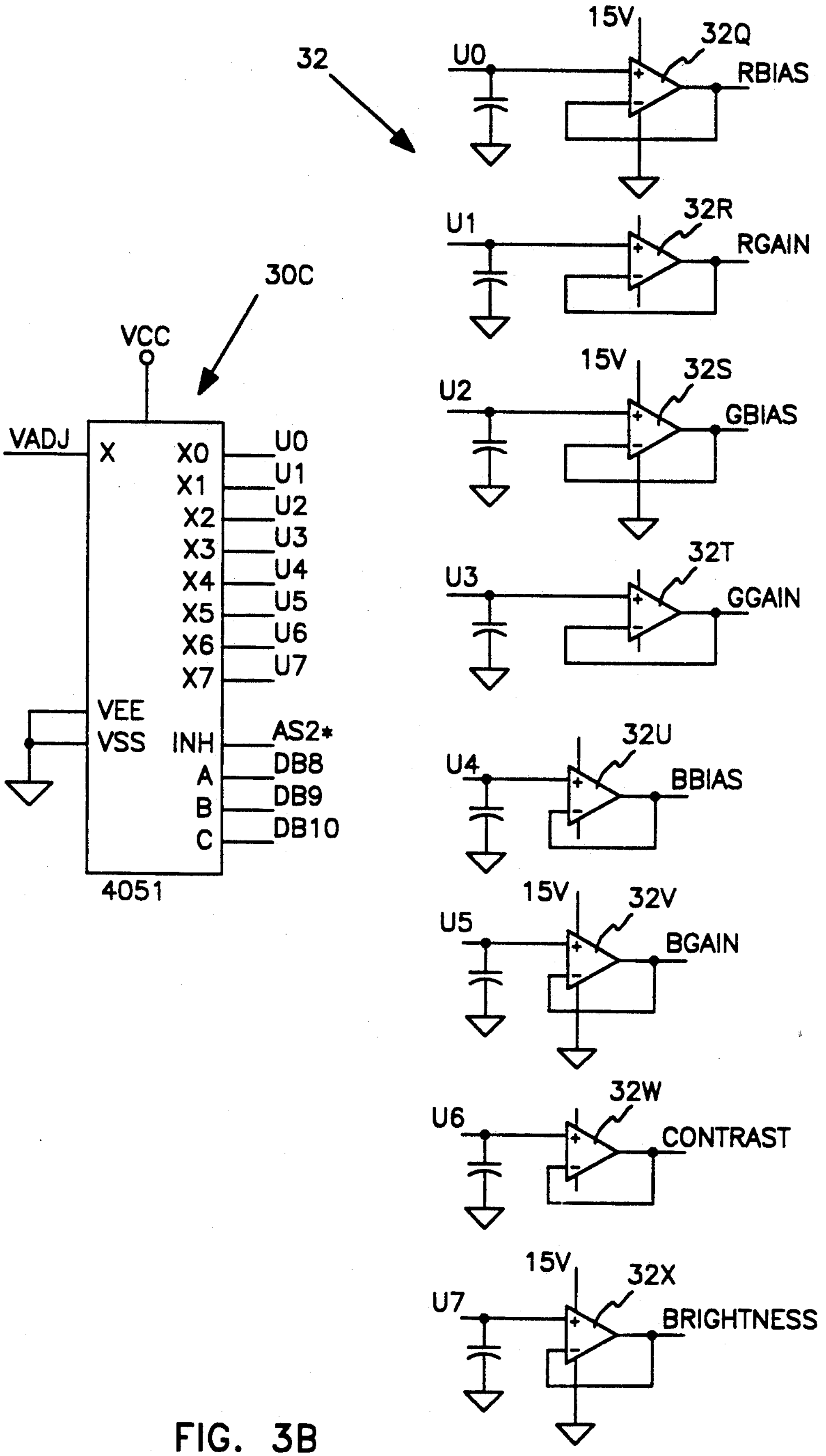
Figure 4A:
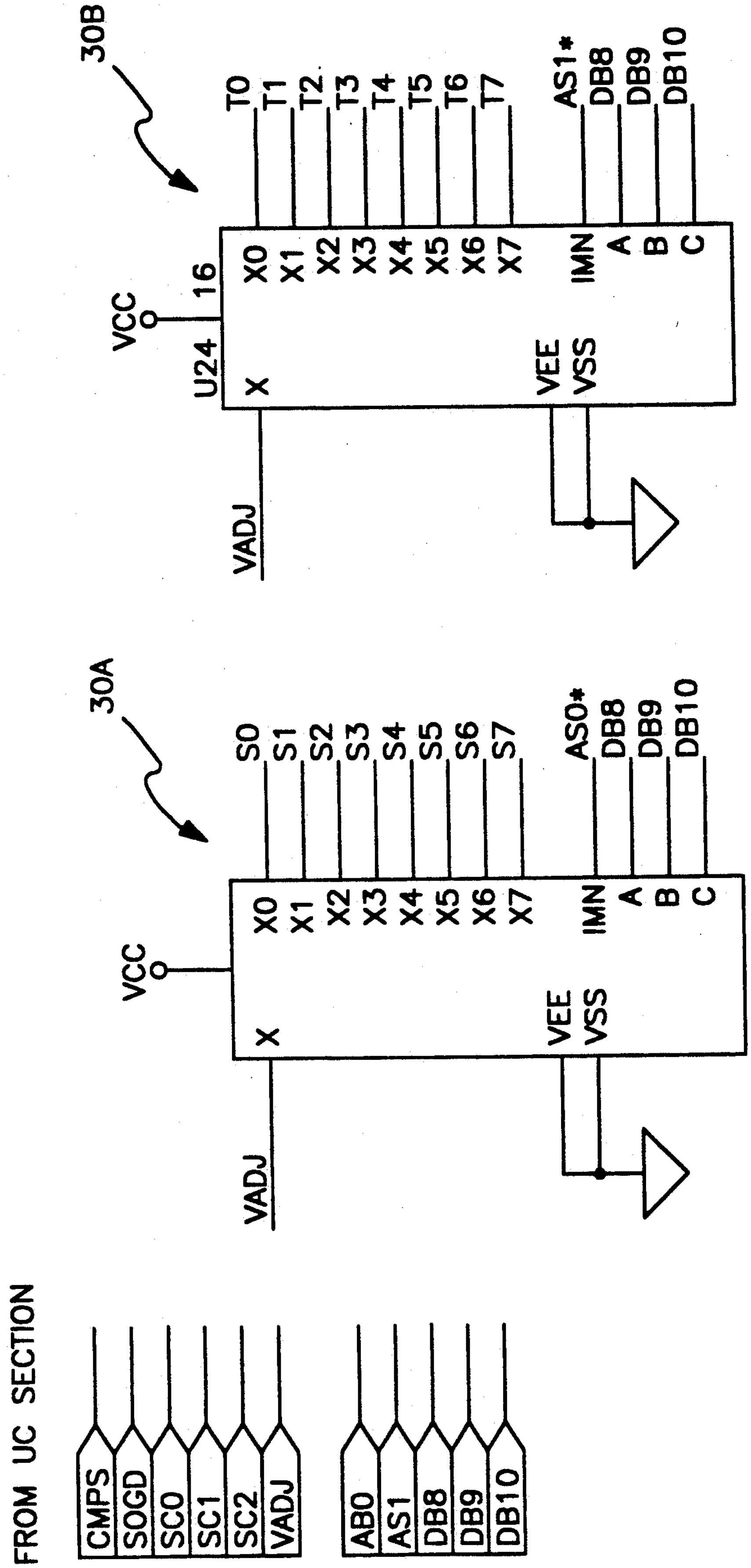
FIGS. 4A-4E show a circuit diagram of several analog switches and associated sample and hold circuits.
Figure 4B:
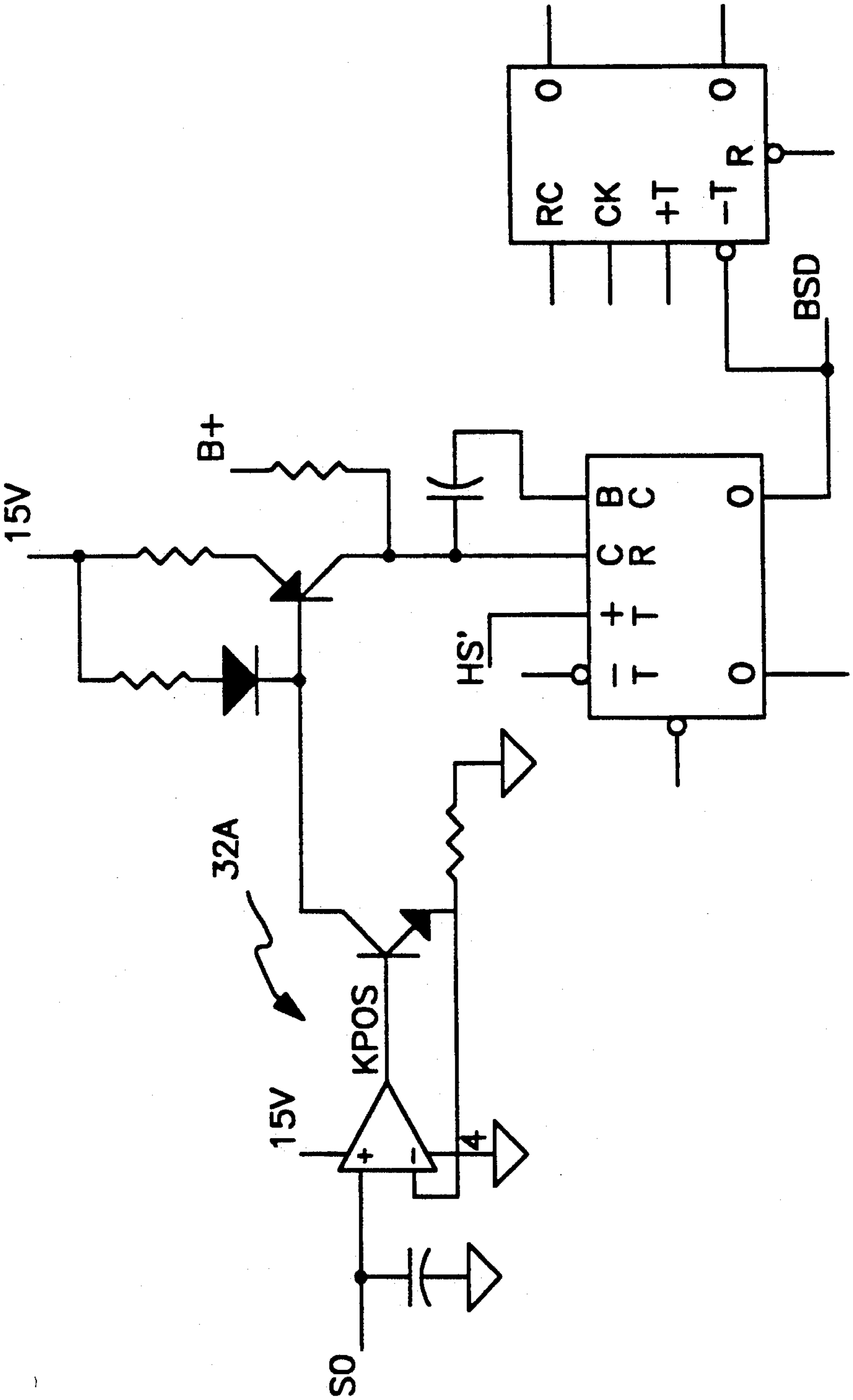
Figure 4C:
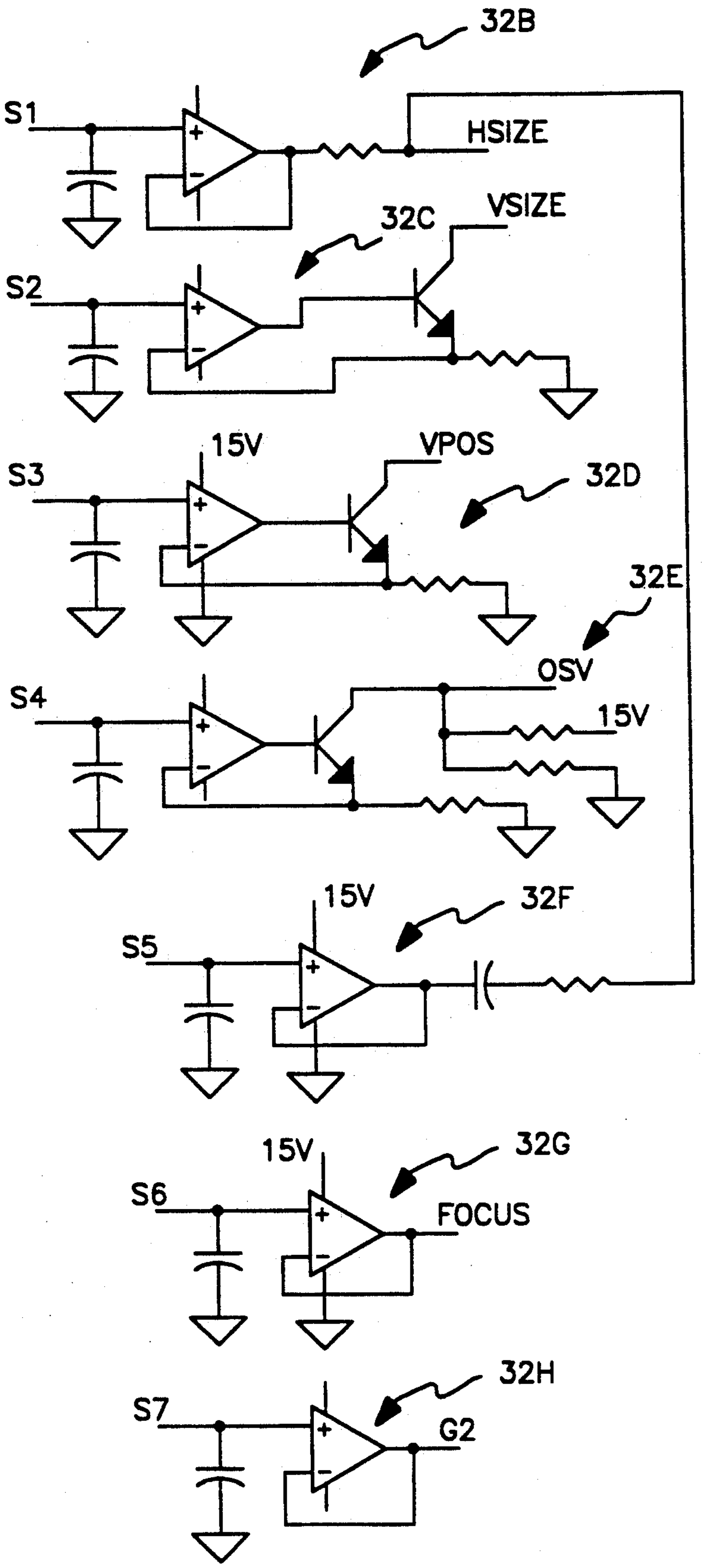
Figure 4D:
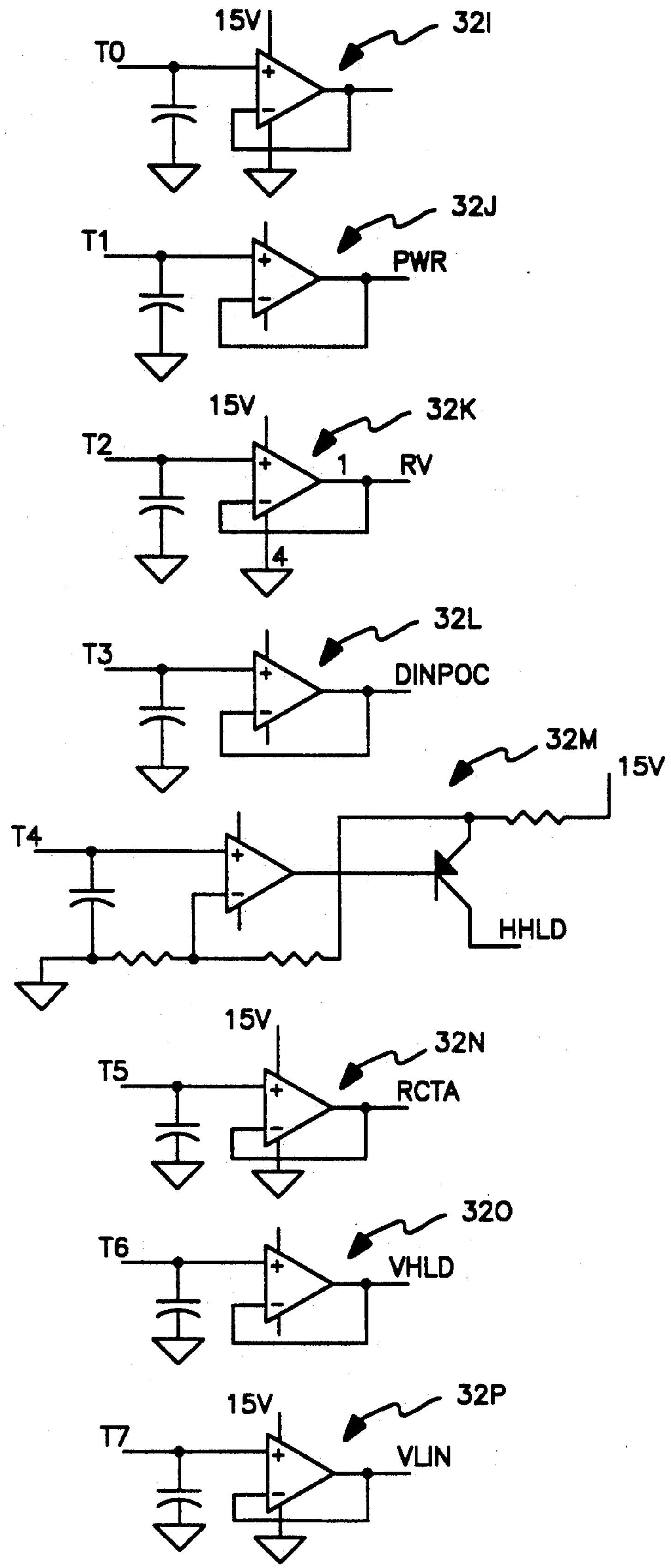
Figure 4E:
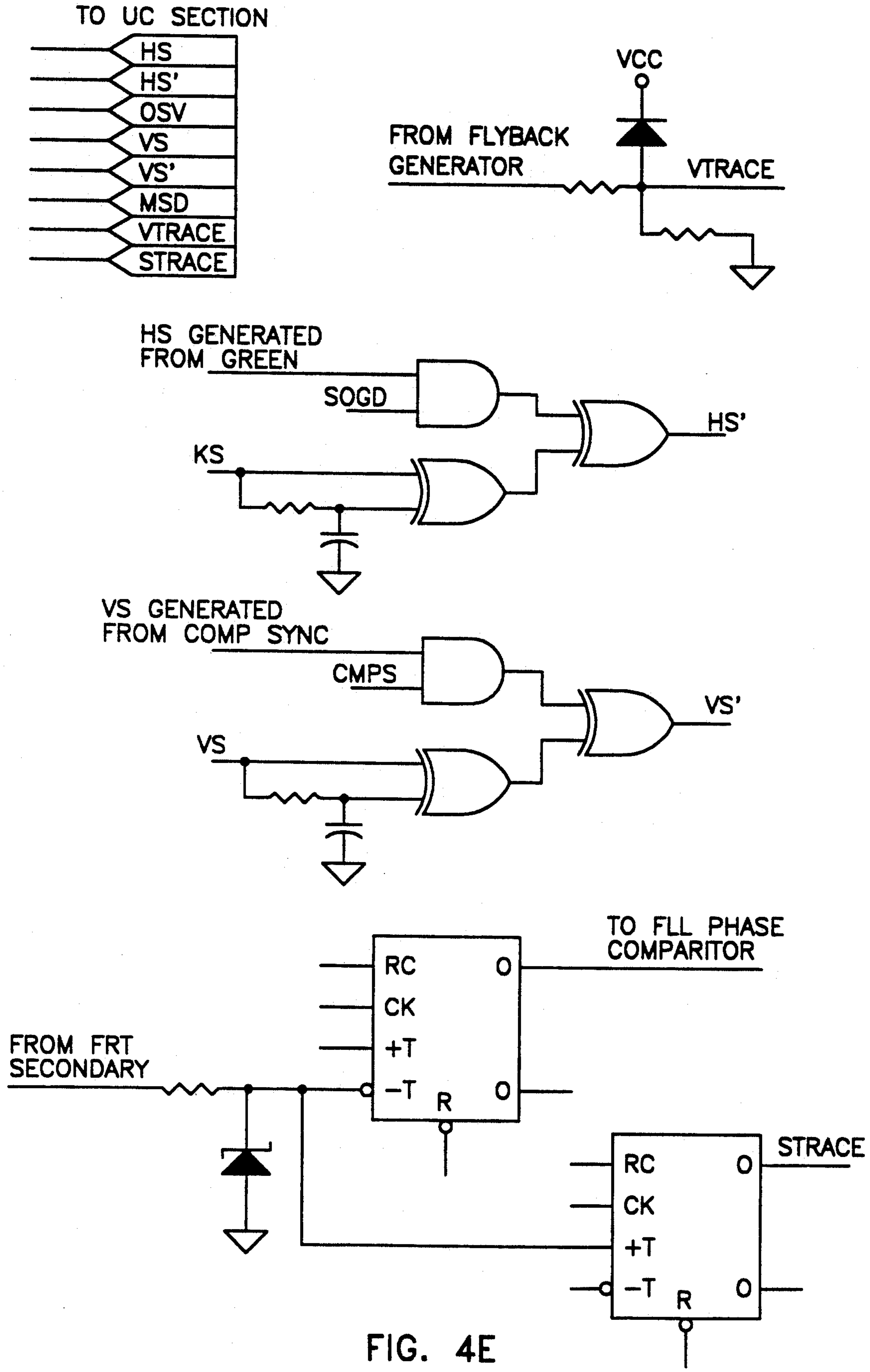

FIGS. 2, 3 and 4 present circuit schematics of the present invention that describe its construction and operation in greater detail. FIG. 2 reveals most of the video display adjustment and on-screen menu system 10. The front panel 18 in the preferred embodiment comprises a series of switches having outputs labeled Reset, Up, Down and Select. Reset resets all user adjustments to factory preset conditions, Select selects adjustments from the on-screen menu, Up increments an adjustment, and Down decrements an adjustment. These switch-provided inputs can be complemented by a series of direct inputs from a PC connector 20, allowing direct input to the menu system from an automated factory adjustment system. The inputs are buffered by an input latch 22, comprising a 74LS373 octal transparent latch with 3-state outputs. The microcontroller 24 reads information from the input latch through its ports P0.1 through P0.7 whenever LAT1 is enabled. The horizontal sync (HS) and vertical sync (VS) signals are also sent through the input latch 22 to the microcontroller 24, which determines whether they are present and their polarities. If HS and VS are not present then either SOG or a composite sync signal is used. The HS signal is sent to the INTO port of microcontroller 24 since its pulse width can be too small to be detected by the microcontroller 24 otherwise. The monitor can receive sync information in three ways: (a) separate horizontal and vertical sync signals; (b) a composite sync signal (where the horizontal and vertical sync are added together into one sync signal); and (c) a Sync On Green (SOG) signal, where the composite sync signal is added to the GREEN signal. The microcontroller 24 determines which of the three types of sync signal is being sent, then generates the SOG and CMPS signal to let the corresponding circuits know what is being sent.

The microcontroller 24 preferably employs a 80C51 CMOS 8-bit CPU and a 16 MHz oscillator. In addition to controlling the on-screen menu system and the CRT display parameters, the microcontroller 24 creates the pin-cushion correction waveform for the display. A 16 MHz oscillator was chosen to provide the necessary bandwidth to synthesize the waveform. The signals used throughout the invention as inputs and outputs of the microcontroller 24 have the following meanings: INTO is an external interrupt activated by a high-to-low transition of the vertical sync signal, that lets the microcontroller 24 know when to start generating the pin-cushion signal. Therefore, the preferred embodiment uses a negative vertical sync signal. The DUO input is also used to determine if the monitor is running synchronization on green and the horizontal sync HS. This alterative procedure occurs when the input latch 22 is enabled and the HS signal passes through to INTO. An inverter 49 is used to invert the VS signal and provide an open collector output to share with the input latch's HS output. The inverted signals HS' and VSI are always positive going horizontal and vertical synchronization pulses. INT1 provides an output signal WEEP* that is the chip enable command for the EEPROM memory 25 when reading and writing to the EEPROM 25.

The T0 input receives the HS' signal, allowing the microcontroller 24 to count the number of scan lines. The number of lines is used by the pin generation algorithm, and also to look up appropriate display parameters for a new horizontal frequency and then output these new parameters to the display. T1 provides the CRID output signal that is logical 1 when the on-screen menu is enabled. Port P1.0–7 is an eight-bit data port that outputs the display parameter signals (including the pin-cushion waveform) to the DAC 28.

The RXD pin outputs a CLRL signal that clears the row counters 38. This method is used for ease of programming and speed. There are only two dead periods during the display tracing where the pin-cushion waveform is not generated: during vertical retrace and in the center of the display. Two separate displays are shown during the on-menu operations of the present invention: a main menu, and a smaller Value Indicator Graph (VIG) that graphically represents the increments and decrements made by a user to a given display parameter (such as brightness). There is enough time in the center of the trace to allow the VIG to be erased and re-written to the screen while keeping the display steady. When the main menu is being displayed, however, there is not enough time even during the center portion of the trace. Therefore, the present invention rewrites the main menu in two complete trace cycles. First the menu is cleared from the SRAM display memory area 40 in one cycle, and then is written in the next cycle, when the row counters 38 are also cleared.

The TXD pin outputs the WRAM* signal which is the SRAM write enable signal, for writing to the display memory 40. The ALE pin outputs the Address Latch Enable (ALE) signal which is the general read/write enable signal generated by the microcontroller 24 for reading and writing all external RAM and ROM memories (such as EEPROM 25 and display memory 40). The WR* signal is the write enable command generated by the microcontroller 24 for writing to external RAM and ROM memories, while the RD* signal is the read enable command for reading these external memories.

LATO is used to control the output latch 26, LAT1 is used to control the input latch 22. ASO*, AS1* and AS2* enable analog switches 0, 1 and 2 respectively (analog switches 30A, B and C). The rest of port P2 (P2.0 through P2.2) along with port P0 (P0.0 through P0.7) provides an 11-bit data and address bus DB0–10 for accessing external RAM and ROM through the invention. DB0–5 connect to the output latch 26 comprising a 74LS174 hex D Flip-Flop integrated circuit. Output latch 26 stores several of the display parameters that are changed whenever a new video mode is present. The stored parameters of the output latch are changed by enabling LATO upon recognizing the new video mode, latching the outputs of P0.0–5 (via DB0–5) to the outputs of the output latch. The CMPS signal is 1 if no VS signal is present, indicating a composite video signal. The SLO signal controls the size of the characters displayed. If SLO equals 0, each character has an 8 by 16 cell. If SLO equals 1, the cell is 8 by 32. The SLO signal is sent to the character size control block 36 discussed further below.

Signals SC0–2 comprise a 3-bit signal indicating the horizontal frequency. If the signals SC0–2 equal 7, the frequency is 30 khz, if the signals SC0–2 equal 0, the frequency is 75 khz. All other values proportionately divide up the frequency spectrum between these two extremes. The SC0–2 values can then be used to switch in S capacitors for different frequencies to keep acceptable horizontal linearity of the display. The use of S capacitors for this purpose is well known to those skilled in the art.

The EEPROM chip 25 used in the preferred embodiment is an XL2816AP-250 that is rated for a minimum of 10,000 writes per byte of memory. The EEPROM 25 stores all the video display adjustment settings. - The chip select read enable (RD*) and write enable (WR*) are controlled by the microcontroller 24 as discussed above. The EEPROM chip 25 outputs DO-7 are sent to the P0 port of the microcontroller 24. The address lines for the EEPROM chip 25 come from the column and row counter outputs COL 0 through COL 4 and ROW 0 through ROW 5. To minimize the number of separate components, the present invention uses the column and row counters 34 and 38 also as address latches for addressing the EEPROM 25. The particular chips chosen for the column and row counters 34, 38 (discussed below) are presettable, allowing them to function as these latches. First, DB0–10 loads the EEPROM read/write address into the column and row counters 34 and 38, enabled by the ALE signal. Then, the counters' outputs address the appropriate byte of EEPROM memory while DB0–7 reads or writes that byte's data.

The digital-to-analog (DAC) block 28 receives its 8-bit digital signal from port P1 of microcontroller 24, and converts the signal to analog form to provide to the analog switches 30 and their respective sample-and-hold circuits 32. The DAC 28 provides a <1% linearity with a linear change in digital input. While the schematic of FIG. 2 illustrates the DAC 28 comprising discrete components, an appropriate integrated DAC can be substituted. An 74LS05 hex inverter IC provides an open collector hex inverter since the P1 outputs of the microcontroller 24 are not truly open collector and can cause non-linearities. The specifications of the particular components are as shown in FIG. 2. The output VADJ of the DAC 28 connects with three analog switches 30.

Referring now to FIGS. 3 and 4, each analog switch 30 comprise a CD4051B single 8 channel analog multiplexer. The single DAC output VADJ drives the three separate analog switches 30 to provide 24 separate adjustments. Each respective analog switch 30A, B and C is switched to on via signals AS0–2. Data bus lines DB8–10 then select 1 of 8 output lines of the analog switch to enable. At the beginning of each vertical sweep, all 24 adjustments are updated by sequentially turning on each analog switch and then, in turn, that switch's separate output lines S0–7, T0–7 and U0–7.

24 individual sample-and-hold circuits 32 are provided. Each circuit receives one line from a given analog switch 30. For example, switch **32*g* receives signal S6 from analog switch 30*a*. The signal S6 is turned on when ASO* is high, and DB8–10** reads "110".

Switch **32*g*** the Focus adjustment for the display. All the switch outputs, connection and truth tables are provided below in Table 1.

TABLE 1

| Switch | Adjustment | Input | AS0* | AS1* | AS2* | DB8 | DB9 | DB10 |
|---|---|---|---|---|---|---|---|---|
| 32a | HPOS | S0 | 1 | 0 | 0 | 0 | 0 | 0 |
| 32b | HSIZE | S1 | 1 | 0 | 0 | 0 | 0 | 1 |
| 32c | VSIZE | S2 | 1 | 0 | 0 | 0 | 1 | 0 |
| 32d | VPOS | S3 | 1 | 0 | 0 | 0 | 1 | 1 |
| 32e | OSV | S4 | 1 | 0 | 0 | 1 | 0 | 0 |
| 32f | HSIZE | S5 | 1 | 0 | 0 | 1 | 0 | 1 |
| 32g | FOCUS | S6 | 1 | 0 | 0 | 1 | 1 | 0 |
| 32h | G2 | S7 | 1 | 0 | 0 | 1 | 1 | 1 |
| 32i | n/a | T0 | 0 | 1 | 0 | 0 | 0 | 0 |
| 32j | PWR | T1 | 0 | 1 | 0 | 0 | 0 | 1 |
| 32k | NV | T2 | 0 | 1 | 0 | 0 | 1 | 0 |
| 32l | DYNFOC | T3 | 0 | 1 | 0 | 0 | 1 | 1 |
| 32m | HHLD | T4 | 0 | 1 | 0 | 1 | 0 | 0 |
| 32n | HCTR | T5 | 0 | 1 | 0 | 1 | 0 | 1 |
| 32o | VHLD | T6 | 0 | 1 | 0 | 1 | 1 | 0 |
| 32p | VLIN | T7 | 0 | 1 | 0 | 1 | 1 | 1 |
| 32q | RBIAS | U0 | 0 | 0 | 1 | 0 | 0 | 0 |
| 32r | RGAIN | U1 | 0 | 0 | 1 | 0 | 0 | 1 |
| 32s | GBIAS | U2 | 0 | 0 | 1 | 0 | 1 | 0 |
| 32t | GGAIN | U3 | 0 | 0 | 1 | 0 | 1 | 1 |
| 32u | BBIAS | U4 | 0 | 0 | 1 | 1 | 0 | 0 |
| 32v | BGAIN | U5 | 0 | 0 | 1 | 1 | 0 | 1 |
| 32w | CONTRAST | U6 | 0 | 0 | 1 | 1 | 1 | 0 |
| 32x | BRIGHT | U7 | 0 | 0 | 1 | 1 | 1 | 1 |

Each sample-and-hold (S/H) circuit 32 comprises an LM358 low-power op amp. The capacitors chosen for the S/H circuits 32 are 0.033 μfarads. Each S/H circuit 32 is updated for 6 μsecs. every vertical sync pulse.

Referring back to FIG. 2, the character display block 16 provides the on-screen menus and value indicator graphs for changing the display parameters. The display of the menus is regulated by the column and row counters 34 and 38. Column counters 34 preferably comprise chained 74F161 synchronous presettable binary counters. The first three output lines AD0–2 clock the eight pixels of each character pixel line and latch data from the character PROM 42 to the Shift Register 46. The higher-level signal lines COL0–COL4 address the display memory 40, indicating which character on the current menu line is active. The final output, RCO, indicates that the 32 columns of the menu line have been completed, and temporarily stops the video oscillator clock 44, until the next horizontal sync signal HS activates the clock again. The CLK signal for the counters is generated by the video oscillator clock 44. As noted above, the column and row counters 34 and 38 double as address latches for reading and writing the EEPROM 25. During these operations, the ALE signal is substituted for the CLK signal.

The row counters 38 are also formed from chained 74LS161 synchronous presettable binary counters. The first 2 outputs of the row counters LNE1-2 are sent to the character PROM's second and third input bits, since each character has eight lines and each line is at least doubled (and sometimes quadrupled). LNE0 (which attaches to the character PROM's first input, comes directly from the character size control block 36, discussed further below. The remaining output signals ROW0-5 address the display memory block 40, determining which row of character to display. Again, since the counters double as address latches for reading and writing the EEPROM 25, the data is latched using ALE instead of the CLK signal.

The character size control block 36 sits functionally between the column counters 34 and the row counters 38. During menu display, as the columns for a given row (of character pixel line information) are exhausted, the character size control block determines whether to advance the row counters to the next row. In lower horizontal frequencies, each line of a character is doubled: i.e., the column counters cycle through two complete cycles of the same character line before advancing the row counters. At higher frequencies, when characters would appear squashed, the character size control block 36 retards the row counter advance for four complete column cycles. The character size control block 36 counts horizontal rows by using the HC* signal from the column counter block 34, which is the same as the horizontal sync signal HS.

The character size control block 36 preferably comprises a 74LS393 dual 4 stage binary counter and a 74LS151 8 input multiplexer, as indicated in FIG. 2. The SL0 signal is sent by the output latch 26 and determines how many repetitions a row should have. If SLO=0, the horizontal frequency signal HS is divided by 2, to obtain the baseline 8 by 16 character cell. If SLO=1, the HS signal is divided by 4, to obtain an elongated 8 by 32 character cell. When no display is required, the ALE signal is substituted as the row clock so that address lines can be latched into the row counters 38 (when they function as address latches). The LCL signal line is the clock line for the row counters. Again, the CLRL signal from the microcontroller 24 clears the counters during the Vertical Retrace, while the CRID* signal is the CRT display enable signal. The following Table 2 provides the relation between these signals.

TABLE 2

| CLRL | SL0 | CRTD* | LCL |
|---|---|---|---|
| 1 | X | 0 | 0 |
| X | X | 1 | ALE |
| 0 | 0 | 0 | HS/2 |
| 0 | 1 | 0 | HS/4 |

The addresses generated by the column and row counters 34 and 38 are sent to the display memory block 40, comprising 2 1K by 4 static RAM 2114Al-2 chips. ROW0-4 are the row address lines, allowing 32 possible menu rows to be stored, and COL--4 are the column address lines, allowing 32 characters per row. DB0-7 are the data input lines from the microcontroller 24 that can store characters for each address location. Outputs DB0-5 connect to the character PROIF 42 to indicate which character to display, while outputs DB6-7 connect to the video drive 48 to cause appropriate video blanking and color for the menu. As discussed above, the WRAM* signal is the write enable for the display meniory SRAMS, and the microcontroller VrR* signal connects to each chip's CS* pin. The VFEEP* signal is 0 if writing to the EEPROM 25, such that no writing is done to the display memory 40.

In the preferred embodiment, although the system is capable of displaying 32 rows, a maximum of 16 rows can be displayed before the VS signal clears the counter. To assure that the display is always in the horizontal active area, only columns 8 through 24 are used. Also, due to speed limitations of the microcontroller 24, only 5 rows are used.

The character PROM memory block 42 comprises a 74S472 512-by-8 byte TIL PROM. Signals LN0-2 comprise the 3-bit character line address (providing 8 lines per character) that comes from the row counters 38. Signals DB0-5 comprise the 6 bit character address (allowing 64 possible characters) from the display memory block 40. Data lines 01-8 provide the character pixel line information (having 8 pixels per character line) latched from the character PROM memory block 42 to the shift register block 46 for output to the video display. DB0-5 determine which character to display, while LN0-2 determine which line of that character to output. The character PROM 42 outputs the 8 pixels of the current pixel line of the current character.

The video clock 44 provides the coordinating timing mechanism for the character display section 16. The clock 44 is a variable oscillator that is synchronized to the incoming horizontal frequency. The clock's frequency is controlled by varying an OSV voltage (determined by microcontroller 24 and stored by S/H circuit 32*e*) such that character size is kept fairly constant, regardless of horizontal frequency. The oscillator is kept synchronous to the horizontal frequency to maintain the menu information stationary on the video display.

The video clock frequency is varied by controlling the Constant current source to the oscillator by varying OSV. The clock is synchronized to the horizontal frequency by gating the horizontal sync signal HS with the oscillator, starting the oscillator when each horizontal line occurs. The clock is turned off when the columns for the display complete their cycle for one line. The OSV signal is an analog 10-15 V signal stored by S/H circuit 32*e*. RCO from counter U10 goes high when the counters reach FF (their end) and lulls the video clock by using a 74LS393 as a latch. The horizontal sync signal HS' restarts the clock by clearing this 74LS393 latch. The output CLK drives the counters 34 and 38, while the inverse output CLK* drives shift register 46. Table 3 presents a truth table relating these signals.

TABLE 3

| CRTD* | HS' | RCO | CLK* |
|---|---|---|---|
| 1 | X | X | ALE |
| 0 | 1 | X | 0 |
| 0 | 0 | 0 | Video Clock |
| 0 | 0 | 1 | 0 |

The video clock 44 uses a 74F132 quad 2 input NAND Schmitt trigger, a 74LS02 Quad 2 input NOR gate, and other discrete components as indicated. The clock output is between 10 and 20 Mhz dependent on incoming horizontal frequency. The clock's frequency preferably defaults to be proportional to the horizontal frequency. However, the user can also adjust the oscillator frequency for each mode by making selections on the menu, thereby controlling the horizontal size of the characters.

The shift register 46 is a 74F166 8 bit shift parallel-to-serial register. Data lines 01-8 from the character PROM 42 provide the video information to the shift register (the current pixel line for the current character). The CLK* signal from the video clock 44 shifts the data to the output one bit at a time. AD0-2 are from the column counters 34 that latches a new set of pixel information every 8 video clock ticks, loading the next character's pixel line. Z is the video signal output sent to the video drive 48.

The video drive block 48 drives transistor amplifiers on the video display's driver circuitry. The video information normally sent to the video display is blanked for an entire character whenever character information is written to the display during menu operation. All other times, the normal video information is sent to the video display. The video drive block 48 employs three 74LS08 Quad 2 input AND gates. The Z line is the video signal from the shift register, signal DB6 allows the Z signal to also drive the blue video signal, and signal DB7 is from the display memory block and blanks the PC's video for 1 character cell. The CRTD* signal is used to avoid false triggers: the system only blanks a character cell when this signal is active. RGD is the video signal drive for the red and green video signals. BD is the blue video signal, and BLANK blanks the RGB video signal sent from the computer that normally drives the display.

Figure 5:
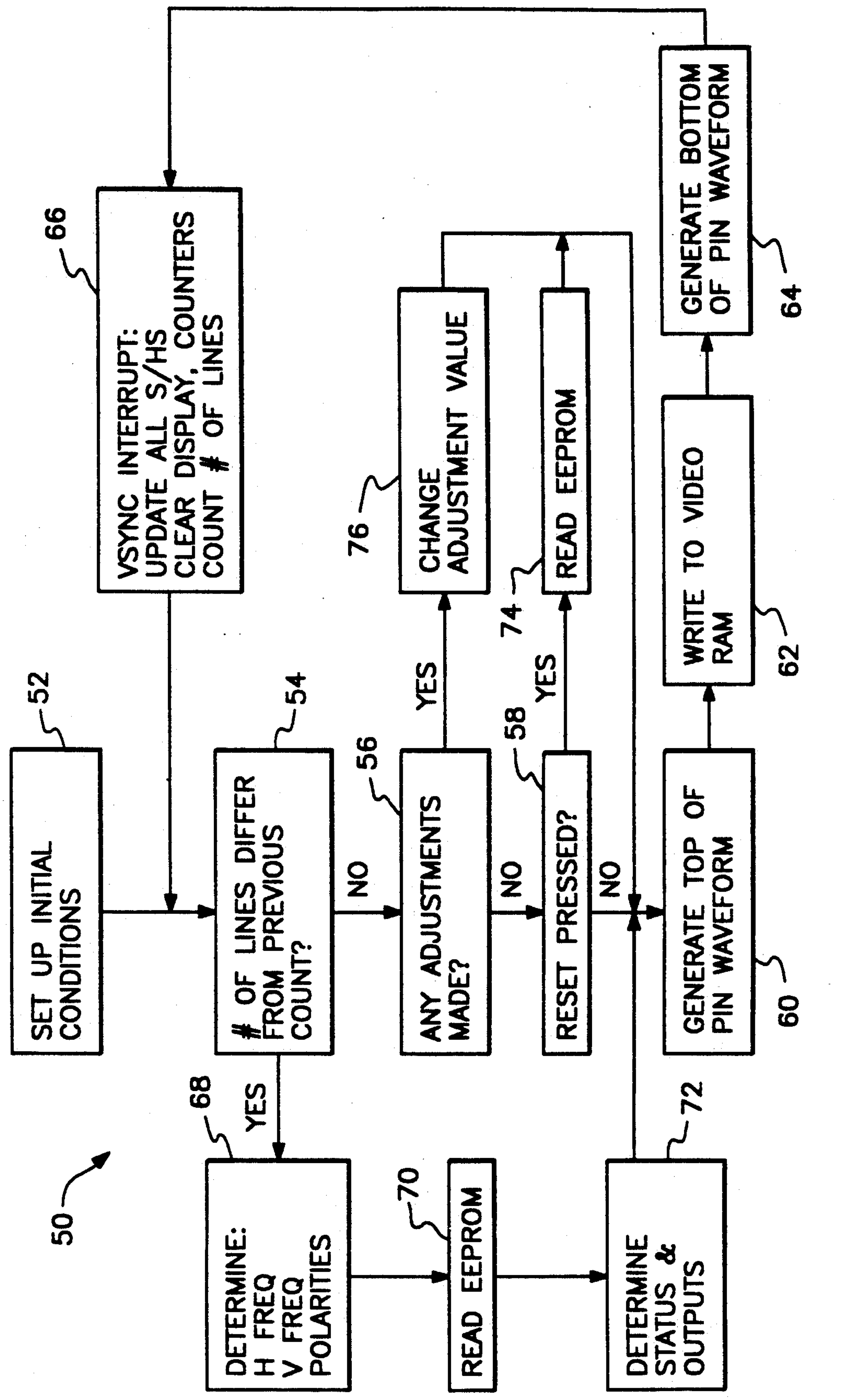
FIG. 5 shows a flow chart of the operation of the present invention.

The sequential operation of the present invention is described in flow chart 50 of FIG. 5. Upon video display start-up, the initial conditions for the display are read 52 by the microcontroller 24 from the EEPROM memory 25 and sent via the DAC 28 and digital switches 30 to the individual sample-and-hold circuits 32. During every vertical retrace, the microcontroller 24 counts the number of horizontal lines traced and determines 54 if the number of lines differ from the previous count. If not, the microcontroller asks 56 whether the user has started to make any adjustments. If that is also not true, the microcontroller determines 58 if the reset button on the front panel 18 has been pressed. If the answer is also false, the microcontroller begins generating the top of the pincushion waveform 60. If any menu is being displayed, its contents are written 62 at the middle of the display trace to the display memory block 40. Then the microcontroller 24 generates the bottom of the pincushion waveform 64.

When the vertical sync interrupt occurs 66, the microcontroller 24 updates all S/H circuits 32, clears the menu display and counters 34, 38 and 40, and counts the number of horizontal lines again. If the line count is different, a different horizontal frequency is being used. The microcontroller 24 then determines 68 the horizontal frequency, the vertical frequency and the polarities of the signals. Having determined which new frequency mode is being used, the menu system then reads the appropriate display parameters 70 from the EEPROM memory 25. These display parameters are then converted and sent 72 to the S/H circuits 32, and the microcontroller 24 begins the normal operation of generating the pincushion waveform in steps 60 through 66. If a user has begun changing any adjustments, as determined in step 56, the microcontroller 24 changes the appropriate adjustment value, both in the EEPROM memory 25, and at the next vertical retrace 66, the appropriate S/H circuit 32. If the user presses the Reset button at step 58, the microcontroller 24 reads 74 the appropriate EEPROM memory for the factory-default standards for the current frequency mode. Meanwhile, the nominal operation of generating the pincushion waveform, displaying the menu display, and updating the S/H circuits 32 at the vertical sync signal occur as before in steps 60 through 66.

While the present invention has been described with reference to preferred embodiments, those skilled in the art wig recognize that various modifications may be provided. For example, any of the various electrical components can be replaced by other discrete or integrated circuitry having an equivalent function. Various menu configurations of columns and rows can be chosen depending on display requirements. Not all the discussed display parameters need to be included in the set addressed by the on-screen menu system, and others not described may be added. The exact order and timing of various circuit operations can be modified to correspond to different displays and requirements. These and other variations upon and modifications to the described embodiments are provided for by the present invention, the scope of which is limited only by the following claims.

What is claimed is:

1. An apparatus for adjusting video display controls in a multi-frequency video display, comprising:

input control means for providing user input;

microcontroller means for receiving user input from said input control means and for controlling said adjusting of said video display controls;

memory means for storing parameters of adjusted video display controls, said memory means electrically connected to said microcontroller means;

display adjustment means for providing said parameters of said adjusted video display controls to said multi-frequency video display, said display adjustment means controlled by said microcontroller means; and on-screen display means for displaying visual representations of said adjustment of said video display controls on a screen of said video display, across different frequency modes of said multi-frequency video display.

2. The apparatus of claim 1, wherein said on-screen display means includes a video clock for synchronizing said displayed visual representations with a horizontal synchronization signal of said multi-frequency video display.

3. The apparatus of claim 1, wherein said on-screen display means includes a character size control means for controlling the absolute size of said displayed visual representations across different frequency modes of said multi-frequency video display.

4. The apparatus of claim 1, wherein said input control means includes a plurality of electrical buttons.

5. The apparatus of claim 1, wherein said memory means includes an erasable electrically programmable read-only memory.

6. The apparatus of claim 1, wherein said on-screen display means comprises:

column counters for storing and outputting address instructions coupled to the microcontroller means;

row counters for storing and outputting address instructions coupled to the microcontroller means;

a display memory, said display memory storing instructions for displaying said visual representations, said instructions received from said microcontroller means, said display memory coupled to the column counter;

a character read-only memory, said character read-only memory providing character data for displaying said visual representations, said character read-only memory providing said character data upon receiving said stored instructions from said display memory, said display memory delivering said stored instructions to said character read-only memory upon receiving address instructions from the column counter and the two counter;

a shift register for storing a sequence of character data, said shift register coupled to said character read-only memory; and a video drive for converting said stored sequence of said character data of said shift register into said display of said visual representations, said video drive coupled to the shift register.

7. Apparatus for adjusting video display video display controls in a multi-frequency video display, comprising:

an input control block for providing user input;

a microcontroller capable of receiving said user input from said input control block, said microcontroller capable of controlling said adjusting of said video display controls;

a memory block capable of storing parameters of the adjusted video display controls, said memory block electrically connected to said microcontroller, a display adjustment block capable of providing said parameters of said adjusted video display controls to said multi-frequency video display, said display adjustment block coupled to and controlled by said microcontroller; and an on-screen display block capable of displaying visual representations of said adjusted video display controls on a screen of said video display, across different frequency modes of said multi-frequency video display.

8. The apparatus of claim 7, wherein said on-screen display block includes a video clock block for synchronizing said displayed visual representations with a horizontal synchronization signal of said multi-frequency video display.

9. The apparatus of claim 7, wherein said on-screen display block includes a character size control block for controlling the absolute size of said displayed visual representations across different frequency modes of said multi-frequency video display.

10. The apparatus of claim 7, wherein said input control block includes a plurality of electrical buttons.

11. The apparatus of claim 7, wherein said memory block includes an erasable electrically programmable read-only memory.

12. Apparatus as recited in claim 7 wherein said on-screen display block comprises:

a column counter for storing and outputting address instructions coupled to the microcontroller;

a row counter for storing and outputting address instructions coupled to the microcontroller;

a display memory storing instructions for displaying said visual representations, said instructions received from said microcontroller said display means coupled to the column counter;

a character read-only memory providing character data for displaying said visual representations, said character read-only memory providing said character data upon receiving said stored instructions from said display memory, said display memory delivering said stored instructions to said character read-only memory upon receiving address instructions from said column counter and said row counter;

a shift register for storing a sequence of said character data from said character read-only memory; and a video drive for converting said stored sequence of said character data of said shift register into said display of said visual representations.

13. A method for adjusting video display controls in a multi-frequency video display comprising the steps of:

A) displaying visual representations of adjustments of said video display controls on a screen of said video display, across different frequency modes of said multi-frequency video display;

B) receiving adjustment inputs from a user;

C) adjusting a set of video display parameters stored in a memory, said adjusting corresponding to said adjustment inputs; and D) providing said adjusted video display parameters to said multi-frequency video display, said adjusted video display parameters adjusting said video display controls.

14. The method of claim 13, wherein said displaying step further includes the step of synchronizing said displayed visual representations with a horizontal synchronization signal of said multi-frequency video display.

15. The method of claim 13, wherein said displaying step further includes the step of controlling the absolute size of said displayed visual representations across different frequency modes of said multi-frequency video display.

16. The method of claim 13, wherein said displaying step further includes the steps of:

A) storing instructions for displaying said visual representations in a display memory;

B) registering a current column of said displayed visual representations;

C) registering a current row of said displayed visual representations;

D) addressing a stored instruction in said display memory by using said registered current column and said registered current row;

E) accessing character data in a character read-only memory by delivering said addressed stored instruction to said character read-only memory;

F) storing a sequence of said accessed character data in a shift register; and

G) converting said sequence of said accessed character data into said displayed visual representations.

* * * * *